US006604088B1

(12) United States Patent
Landom et al.

(10) Patent No.: US 6,604,088 B1
(45) Date of Patent: Aug. 5, 2003

(54) AUTOMATIC BARCODE PRINTING SUPPLY PRICE QUOTE SYSTEM AND METHOD

(75) Inventors: David L. Landom, Bellbrook, OH (US); Brad S. Riley, Xenia, OH (US)

(73) Assignee: Monarch Marking Systems, Inc., Miamisburg, OH (US)

( * ) Notice: Subject to any disclaimer, the term of this patent is extended or adjusted under 35 U.S.C. 154(b) by 1377 days.

(21) Appl. No.: 08/526,743

(22) Filed: Sep. 12, 1995

(51) Int. Cl.[7] .............................................. G06F 17/60
(52) U.S. Cl. ........................................ 705/26; 705/27
(58) Field of Search ....................... 364/464.01, 468.01, 364/468.03, 468.13, 468.14; 395/201, 226, 227, 615, 764, 766, 767, 779, 326; 705/1, 7, 10, 27, 28, 26

(56) References Cited

U.S. PATENT DOCUMENTS

| | | | | |
|---|---|---|---|---|
| 4,972,318 A | * | 11/1990 | Brown et al. | 395/226 |
| 4,992,940 A | * | 2/1991 | Dworkin | 395/226 |
| 5,241,464 A | * | 8/1993 | Greulich et al. | 395/226 |
| 5,276,607 A | * | 1/1994 | Harris et al. | 395/226 |
| 5,303,146 A | * | 4/1994 | Ammirato et al. | 395/764 |
| 5,307,260 A | * | 4/1994 | Watanabe et al. | 395/500 |
| 5,499,180 A | * | 3/1996 | Ammirato et al. | 395/764 |
| 5,570,291 A | * | 10/1996 | Dudle et al. | 364/468.01 |

FOREIGN PATENT DOCUMENTS

WO    WO 99/62010    * 12/1999

OTHER PUBLICATIONS

Mark et al, "How Much is a Loyal Customer Worth?", Across the Board, vol. 29, No. 5, pp. 36–39, May 1992.*

* cited by examiner

Primary Examiner—James P. Trammell
Assistant Examiner—John W. Hayes
(74) Attorney, Agent, or Firm—McAndrews, Held & Malloy, Ltd.

(57) ABSTRACT

A system and method are shown for automatically providing price quotes for various barcode printing supply products. The system displays a default quote when a new quote is to be provided. The default quote identifies default values for a number of variables defining a default barcode printing supply product; at least one default quantity value and a price for the specified quantity of the default product. To obtain a price quote on a new product the user need only change the variable values that distinguish the new product form the default product. Further, the system stores a set of allowable options in association with each of a number of the user selectable variable values. When one of these variable values is selected, the system automatically updates the values of other variables on the display in accordance with the allowable option set of the one variable value. The system also allows the quoted price to be deviated by various amounts depending upon the reason for the price deviation request.

20 Claims, 16 Drawing Sheets

Fig. 12

PRICE DEVIATION FORM

VARIANCE TO QUOTED AMOUNTS FOR: BUFFY & BILL'S BOUTIQUE
REASON FOR CHANGE: APPROVAL TO ELIMINATE ONE TIME CHARGE:

| QUOTE 1 | | QUOTE 2 | | QUOTE 3 | |
|---|---|---|---|---|---|
| QUANTITY 1 (M): | 25 | QUANTITY 2(M): | 50 | QUANTITY 3 (M): | 100 |
| # SHIPMENTS: | 1 | # SHIPMENTS: | 2 | # SHIPMENTS: | 4 |
| PRICE / M: | $47.71 | PRICE / M: | $33.74 | PRICE / M: | $28.69 |
| ONE TIME CHARGES: | $445.00 | ONE TIME CHARGES: | $445.00 | ONE TIME CHARGES: | $445.00 |
| NEW ONE TIME $: | $445.00 | NEW ONE TIME $: | $445.00 | NEW ONE TIME $: | $445.00 |
| TOTAL PRICE/M: | $65.51 | TOTAL PRICE/M: | $42.64 | TOTAL PRICE/M: | $32.54 |

APPROVED BY:

CANCEL        OK

Fig. 13

ORDER FORM

CUSTOMER SPECIFIC INFORMATION

CUSTOMER NAME: BUFFY & BILL'S BOUTIQUE
SHIP TO CUST NUMBER:        BILL-TO CAST NUMBER:
P.O. NUMBER:
CONTACT NAME:
CONTACT PHONE NUMBER:

ORDER SPECIFIC INFORMATION

PC QUOTE NUMBER: 8221-R10015    ORDER PRODUCT ID: MMTT R10015
PREVIOUS QUOTE NUMBER:        TERRITORY OVERRIDE?
SHIPPING VIA:
SHIPPING ATTN OF:

CANCEL        CONTINUE

AUTOMATIC BARCODE PRINTING SUPPLY PRICE QUOTE SYSTEM AND METHOD

FIELD OF THE INVENTION

The present invention relates to a system and method for automatically providing price quotes for different types of barcode printing supply products and more particularly, to such a system that minimizes user input, and is extremely fast, flexible and user friendly.

BACKGROUND OF THE INVENTION

Known price quoting systems and methods have not been found suitable for automatically providing price quotes for barcode printing supply products such as tags and labels because of the enormous number of characteristics that can distinguish one barcode printing supply product from another. Different combinations of these characteristics affect the pricing of the products in different ways. Further, when a prospective purchaser requests a product with a specific characteristic, that characteristic may limit the options available for other features of the product thus increasing the complexity of providing valid price quotes.

One known cost estimation system specifically designed for barcode printing supply products requires a user to input a value defining each characteristic or feature of the product for which the estimate is requested. An estimated cost of manufacturing the product is taken calculated once only after all of the characteristic defining values are entered. This system is extremely cumbersome. It requires a long time for the user to enter the needed information and once the information is entered, the system takes hours and remembers therefor even days to generate a cost estimate for a single product. In order to change the value defining only a single characteristic, the user has to reenter all of the other information again and then wait for a new cost estimate to be re-calculated. Thus, this system is extremely slow, cumbersome and difficult to use.

SUMMARY OF THE INVENTION

In accordance with the present invention, the disadvantages of prior price quoting systems and methods have been overcome. The price quoting system and method of the present invention is specifically designed to provide quotes for barcode printing supply products so that the required user input is minimized, quotes can be provided extremely fast and easily while allowing flexibility in the quotes.

More particularly, in accordance with the present invention, upon the start of the system, a default quote is displayed to the user wherein the default quote depicts a default value for each of a number of variables that define a barcode printing supply product. The system stores for each of one or more product defining variables, a set of allowable options for other product defining variables that are associated with the one variable. When a user inputs a new value for one of these variables for which a set of allowable options is stored, the system automatically changes the displayed default quote to depict any necessary changes in the other variables that are associated with the one variable based upon the associated, stored set of allowable options. This feature drastically minimizes the input required from the user. Further, the user does not have to keep track of restrictions or limitations that are associated with the selection of a value for a particular variable since the system does this automatically.

A further feature of the present invention is such that each time a new value for any variable affecting the price is entered by the user, the system automatically adjusts the price in response thereto and displays the adjusted price. This feature enables a user to immediately see how individual variable values affect the price of a given product.

In accordance with another feature of the present invention, the default quote that is displayed each time a new quote is to be started may be reset or modified by a user. Therefore, the default quote displayed for one user need not be the same as the default quote displayed for another user, the difference in the default quotes being determined by the users themselves according to their own individual needs.

Still another feature of the present invention is the ability to allow a user to deviate from a quoted price for a number of different selectable reasons. Depending upon the reason selected by the user for a requested price deviation, different types of deviations to the quoted price are allowed. This feature allows great flexibility in the price quoting system of the present invention.

These and other advantages and novel features of the present invention, as well as details of an illustrated embodiment thereof, will be more fully understood from the following description and drawings.

BRIEF DESCRIPTION OF THE DRAWING

FIG. 12 is an illustration of a display screen utilized when the reason for a requested price deviation relates to the modification of one-time charges; and FIG. 13 is an illustration of a display screen utilized when the user wants to automatically create an order from a stored quote.

DESCRIPTION OF THE PREFERRED EMBODIMENT

Figure 1:
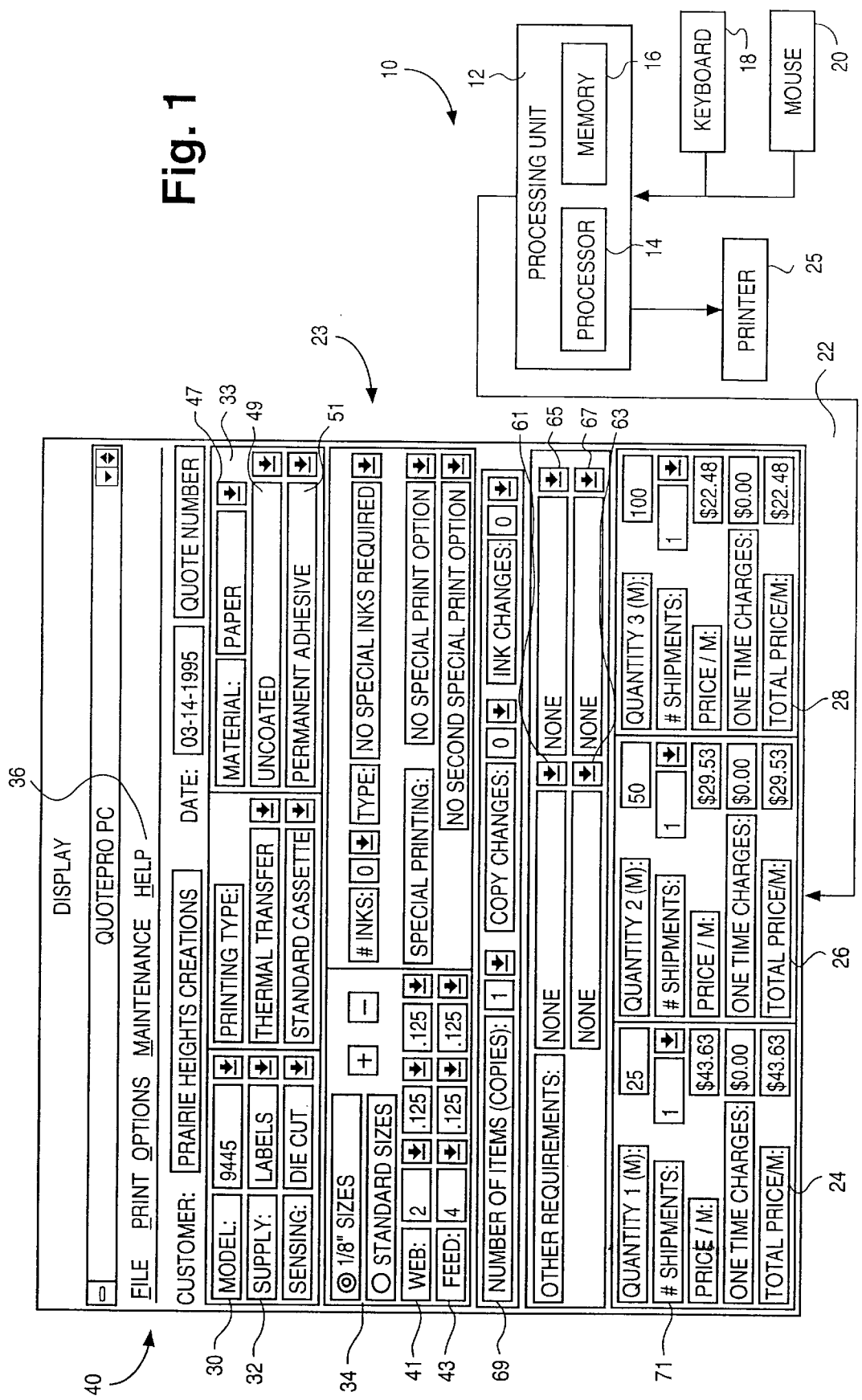
FIG. 1 is a block diagram of a system in accordance with the present invention for automatically providing price quotes for different types of barcode printing supply products.

A system 10 for automatically providing price quotes for a large number of barcode printing supply products such as tags, labels, ink ribbons, ink ribbon cassettes and the like is shown in FIG. 1. The system 10 may be formed of a portable computer, a personal computer, a networked computer terminal etc. having a processing unit 12 with a processor 14 that operates in accordance with software stored in a memory 16. Tile memory 16 includes a scratch pad area for data manipulation and temporary data storage as well as an area that is non-alterable by the user for storing the software, data tables and a default quote as discussed in detail below. The processor 14 is responsive to user inputs via a keyboard 18, mouse 20 or other user operable input device to control the information depicted on a display 22. The processor 14 is also responsive to a user's selection of a Print function to control a printer 25 to print a record of a displayed quote, order, or other requested information.

Upon initiation of the system 10 for price quotes, the processor 14 controls the display 22 to depict a default quote 23. This default quote 23, depicts simultaneously on a single display screen, all of the information necessary to provide a quote including: a default value for each variable that defines a specific default barcode printing supply product; one or more quantities of the specified default barcode printing supply product; and prices for each quantity of the default product quoted. Because this information is displayed together, the user can easily see the relationship between variable values, quantity arid price. The default product specified in the default quote 23 is preferably a product for which quotes are frequently requested and/or the default product has a number of characteristics defined by variable values that are common to a number of other products. Therefore, the number of variables for which values need to be re-specified or input by a user to provide a price quote for another product is minimized. The default quote of the present invention has a number of advantages. Because the default quote is displayed upon initialization of the system, the user can immediately and easily see the cost of a typical barcode printing supply product. By depicting more than one quantity value in the default quote, such as the quantities 25, 50 and 100 shown in the respective display sections 24, 26 and 28 of the default quote 23, the user can immediately see how quantity affects the price of the specified product. Further, the utilization of a default quote minimizes the number of inputs required of the user. The user need only input values for those variables which are different from the displayed default values. As the value of one variable is changed by the user, the system of the present invention automatically recalculates the price and adjusts the price depicted on the display 22 so that the user can immediately see how variations in the value of a given variable affect the price. The price calculation is performed extremely fast and is preferably displayed within seconds of inputting a value change if the change results in a valid product definition for which a price can be calculated as discussed below. Users of the system can thus suggest alternative products to meet both the product requirements of a prospective purchaser, for whom a quote is being prepared, as well as the price requirements of the purchaser quickly and with minimal effort.

Further, as a value for one of the variables depicted on the displayed quote is changed, the processor also updates on the displayed quote, the values of any other variables affected by that one change. The system 10 accomplishes this by storing in the memory 16 in association with a given selectable variable value, a set of allowable options for other variables if that given variable value is selected. A set of allowable options is stored for each of a number of the variable values selectable by a user to generate a quote. For example, a given printer specified adjacent to the input section 30 labeled "Model" might only be able to print tags of a particular type and size. If so, this information is stored in the memory 16 in association with the identity of the given printer. If a user selects that given printer, the system 10 automatically changes the "Supply" section 32 to depict "tags"; a "Material" section 33 to depict at least one material out of which the tags may be made; a size section 34 to depict the allowable size of the tag; and makes any other changes that are required in accordance with tile set of allowable options stored in the memory 16 in association with the identity of the given printer. The set of allowable options may also include restrictions on the product. These restrictions may be depicted on the display in a message window or the like upon user selection of the given variable value for which the restriction is stored. Once the user acknowledges that he has seen the restriction via an input on a device 18 or 20, the restriction message is removed from the display. It is noted that the set of allowable options may be stored in tables or may be incorporated directly into subroutines called upon the selection of a given variable value. The system may also store minimum quantities and/or maximum quantities that can be ordered in one shipment of a particular product. If a user changes a value of a variable with the result that the depicted quantity does not meet a minimum requirement for the new product that is specified in the display quote, the system automatically displays a message to the user informing him of the minimum quantity requirements for the particular product. The user can also select a "help" function 36 to cause detailed information about a specific product or a group of products to be depicted on the display 22. Thus, it can be seen that the price quote system for barcode printing supply products in accordance with the present invention is extremely fast and user friendly, minimizes user input and provides the user with all of the information necessary to quickly and accurately provide price quotes.

Figure 2:
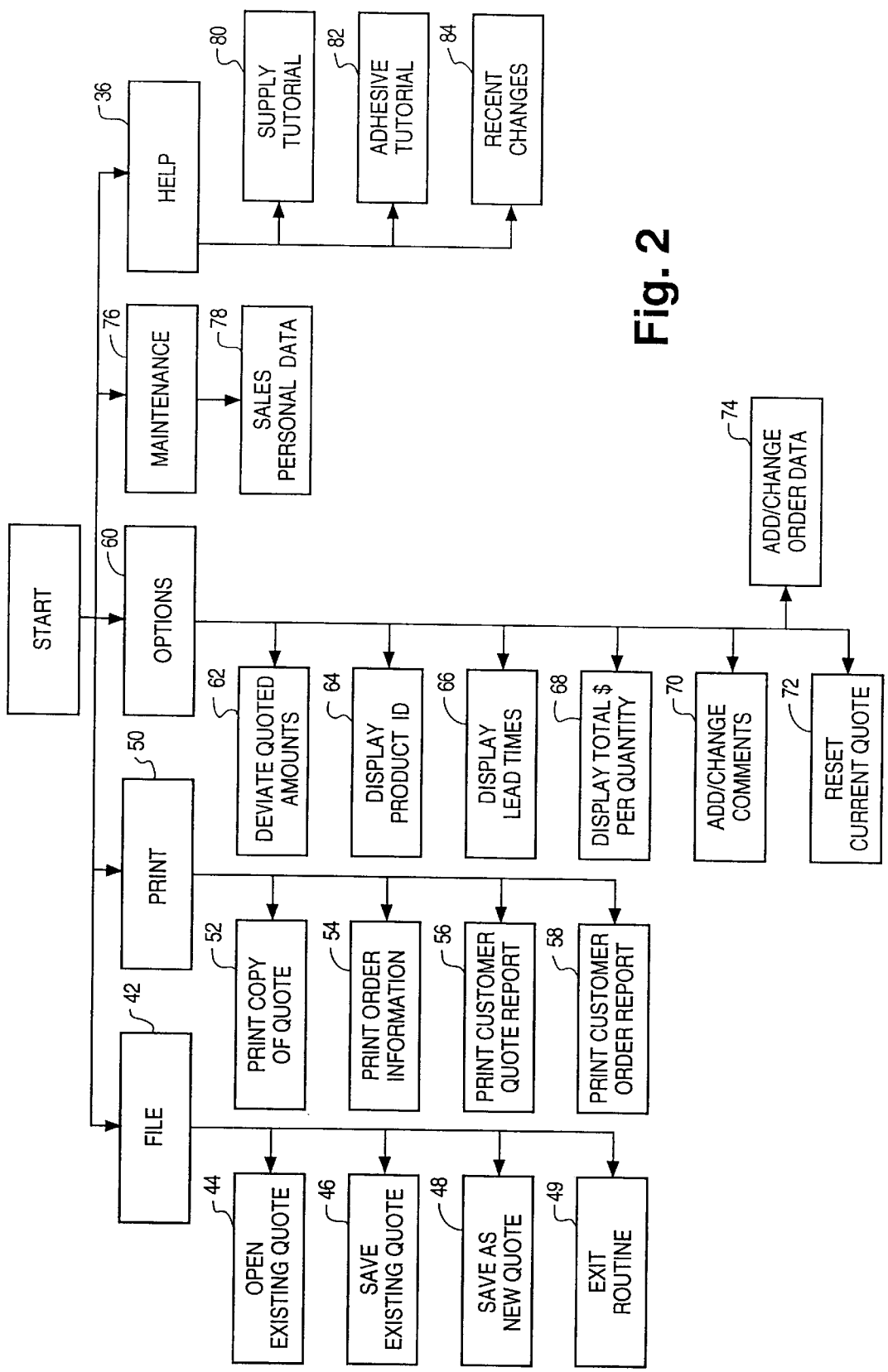
FIG. 2 is a flow chart illustrating various menu items that are selectable by a user on the display of FIG. 1 to cause the system to perform associated functions.

FIG. 2 depicts a flow chart illustrating various user selectable menu items: File, Print, Options, Maintenance and Help, that are displayed in a menu selection area 40 at the top of the display screen depicting a default quote or quote in process. Upon user selection of the File menu item at block 42, the processor 14 will cause the various file options, "open existing quote", "save existing quote", "save as new quote" and "exit routine" to be displayed. Upon the selection of "open existing quote," the processor 14 at block 44 displays information identifying each of the existing quotes that are stored in the memory 16 for various prospective customers. This information may include for example a quote identification number, prospective purchaser's name, the date of the quote, the date of any associated order, the identity of a particular barcode printer for which the product was ordered; and a product identification code. If "save existing quote" is selected, the processor at block 46 automatically assigns a quote number to the displayed quote. If "saving as a new quote" is selected, the processor 14 at block 48 allows a user to reset or change the default quote that is display whenever a new quote is to be started as discussed in detail below. The processor 14 is responsive to the selection of "exit routine" to exit the price quoting system at block 49. At block 49, the processor 14 may also display one or more messages to the user, instructing the user to save the last displayed quote if he wants to retrieve it prior to exiting the routine.

In response to a determination by the processor 14 that the Print menu item has been selected, the processor at block 50 displays the various print options. If a "print copy of quote" menu choice is selected by the user, the processor 14 at block 52 sends a copy of the displayed quote to the printer 25 for printing. Similarly, if "print order information" is selected, the processor at block 54 will send a copy of an entered order resulting from a quote to the printer 25 so that a record thereof can be made. At block 56, the processor 14 is responsive to the selection of a "print customer quote report" menu choice by sending selected information from a price quote to the printer 25 so that the information can be printed. The processor also implements a similar function at block 58 so that selected information from a customer's order can be printed.

The processor 14 responds to a user's selection of the Options menu item by displaying at block 60 a number of selections including: "deviate quoted amounts", "display product Id", "display lead times", "displayed total $ per quantity", "add/change comments", "reset current quote". If the user selects the "deviate quoted amounts" menu choice, the processor at block 62 allows the user to change the quoted price for a product in accordance with a user selectable reason for the requested change as discussed in detail below. The processor 14 is responsive to the "display product Id" menu choice by displaying in a message window an identification code for the product defined by the values of the variables depicted in the displayed quote. Upon selection of the "display lead times" menu choice, the processor 14 at block 66 displays information to the user identifying the type of supply and the barcode printer for which the supply is intended as well as a lead time for each of the one or more quantities specified in the quote. At block 68, the processor 14 is responsive to the selection of "display total $ per quantity" menu choice by displaying the total price quoted for each specified quantity. The menu choice "add/change comments" allows the processor 14 at block 70 to store user entered comments in association with a particular quote number. The processor 14 is responsive at block 72 to the selection of the "reset current quote" menu choice to return to the stored default quote. This default quote may be one that is unchangeable by the user or a personalized default quote that the user creates and stores as his own default quote as discussed in detail below. The processor 14 is responsive to the selection of "add/change order data" menu choice by allowing at block 74 the user to create an order from a current quote as discussed below.

The processor 14 is responsive to the user's selection of the Maintenance menu item at block 76 by displaying a "sales personal data" menu choice. If the user selects this menu choice, the processor 14 at block 78 displays information associated with the user if the information has been previously entered. If the information has not been previously entered and stored or the user wants to change the information, the processor 14 is responsive to user inputs at block 78 to store and display newly entered information. A user may select the Help menu item to obtain information on barcode printing supply products and the system itself. At block 80, the processor 14 is responsive to the selection of a "contents" menu choice by providing a tutorial via the display 22 on a number of different supplies. The tutorial allows the user to see what type of applications various supplies can be used for as well as detailed information regarding the supplies themselves. The processor is responsive to the selection of an "adhesive" menu choice to provide a similar tutorial on adhesive at block 82. Information regarding the system 10 including software version number, etc. can be obtained from the processor at block 84.

FIG. 3 illustrates the operation of the system 10 for automatically providing price quotes for an extremely large number of different types of barcode printing supply products. At a block 100, the processor 14 initializes the system for the automatic price quote operation. After the system is initialized, the processor 14 proceed to block 102 to determine whether the system 10 is already running the price quotation software routine. If so, the processor 14 proceeds to block 106 to display an error message and exit the routine depicted in FIG. 3A. If not, however, the processor proceeds from block 102 to block 104 to determine whether the data bases upon which the price quote routine depends have been properly initialized. If the data bases have not been initialized, the processor 14 proceeds to block 106 to display the error message and exit the routine. Otherwise, the processor proceeds to block 108. At block 108, the processor 14 determines whether the customer or prospective purchaser has an identification that indicates that the customer is entitled to discount pricing. If so, the processor 14 at block 110 stores an instruction indicating that the discount pricing parameters from a particular pricing table stored in the memory 16, and selectable using the customer's Id, are to be used in the price calculations. Otherwise, the standard pricing parameters that are stored in the memory 16 are utilized for the price calculations. Thereafter, the processor 14 proceeds to block 112 to load the default quote information to the display 22 for the display thereof at block 114. As discussed above, the default quote displayed at block 114 includes values for all of the variables that define a default barcode printing supply product as well as one or more default quantities; and a price associated with each default quantity value. As shown in FIG. 1, the default quote 23 identifies the default product as die cut labels that are compatible with a 9445 barcode printer wherein the printing type is to be thermal transfer utilizing a standard ribbon cassette. The labels are to be made from uncoated paper with a permanent adhesive. The width of the supply, i.e. labels, is designated by the "web" section as 2 inches whereas the length of the supply between feed apertures is designated by the "feed" section as 4 inches. The web and feed variance that is tolerated is set to 0.125 inches.

The processor 14 is responsive to a user input that changes the barcode printer model number as determined at block 116 by proceeding to block 118. At block 118, the processor 14 determines whether the type of supply depicted on the displayed quote prior to the printer change is within the guidelines for the newly designated barcode printer. If not, the processor 14 proceeds from block 118 to block 120 to automatically modify the supply width and length as designated in the "web" and "feed" sections 41 and 43 of the displayed quote so that the size of the supply is compatible with the newly designated barcode printer. Thereafter, the processor 14 proceeds to block 122 to determine whether the newly designated barcode printer requires perforations or sense marks on the barcode printing supply that the printer is capable of handling. If so, the processor proceeds to block 124 to determine whether the required perforations or sense marks have already been specified. If they have not already been specified, the processor 14 proceeds to block 126 to display a message to the user reminding him that a perforation or sense mark must be specified in order for the supply to run on the designated printer and that one will automatically be added for the user. This message is preferably displayed in a message window overlying the quote display screen 23 with an acknowledgement selectable by the user. When the user selects the acknowledgement of the message utilizing one of the input devices 18 or 20, the processor removes the message from the display 22. Thereafter, the processor at block 128 changes the displayed quote screen 23 to enter the requisite type of perforation or sense mark in the displayed section identified by the term "sensing." From block 128, the processor 14 proceeds to block 130 to process the printer selection event as discussed in detail with reference to FIG. 4. After executing the subroutine of FIG. 4, the processor proceeds to FIG. 3F to compute the price of the supply for the newly designated printer.

If the processor 14 determines at a block 132 that the user has input a new value for the supply type, the processor proceeds to block 134 to process this new value in accordance with the flow chart depicted in FIG. 5 as discussed in detail below. After processing the new value of the supply type, the processor 14 calculates the price of the product currently defined by the values depicted in the displayed quote. If the processor 14 determines that the user has input a new sensing type at block 136, the processor proceeds to block 138 to process the sensing type selection event in accordance with the flow chart depicted in FIG. 6 as discussed below. Again, after processing this the new value for the variable, sensing type, the processor 14 again recalculates the price for the designated product.

The processor 14 is responsive to the selection of a new printing type such as thermal transfer, thermal direct, etc. as determined at block 140 by proceeding to block 142 to process the particular printing type selected. This processing includes a review of the set of allowable options that are stored in accordance with the selected printing type so that the system at block 142 can automatically update the values of any variables identified in the set of allowable options. For example, if the user selects a thermal direct printing type, the processor 14 automatically updates the variable "cassette type" to depict the message "no cassette/ribbon" since thermal direct printing does not utilize an ink ribbon or ink ribbon cassette. At block 144, the processor determines whether a new cassette/ribbon has been selected by the user and if so, proceeds to process the selection of this event at block 146 in accordance with the set of allowable options stored for the selected variable value. When the user selects a new material type as determined by the processor at block 148, the processor proceeds to block 150 to process the selection of the new material type. It is noted, that if the user does not know which types of materials are available for the supply thus far designated, the user may utilize the mouse 20 to select the arrow box 47 treat is displayed adjacent to the "Material" section. In response thereto, the processor 14 will display the various allowable material choices to the user. The material type is further defined by the input variable values depicted in the respective boxes 49 and 51 on the displayed quote. If for example, a new paper type has been entered into the box 49 as determined by the processor 14 at block 152, the processor proceeds to block 154 to process the paper type selection event in accordance with the set of allowable options stored for the input value. Similarly, if the processor 14 determines at block 156 that the user has changed the adhesive selection, the processor proceeds to block 158 to process this event in accordance with the set of allowable options stored for the selected adhesive. From blocks 154 and 158, the processor proceeds to FIG. 3F to recalculate the price in accordance with the selections made by the user. If the user enters a new size of the supply via the input sections "Web" 41 and "Feed" 43, the processor proceeds from block 160 to block 162 to process the new supply size selection event in accordance with any set of allowable options that may be stored therefore.

The barcode printing supply product may have information pre-printed thereon. In order to have pre-printed information on a supply, an ink must be selected. First, the number of inks to be used is selected as determined at block 164 and processed at block 166 and thereafter the type of ink selected is entered as determined at block 168. If a user tries to enter a type of ink before the number of inks has been entered, as determined at block 170, the processor proceeds to block 172 to display a message to the user in a message window indicating that the number of inks must be set to at least the number "1" before an ink type can be specified. After acknowledging this message, the user can then enter the number of inks and thereafter, the type of ink which events are respectively processed at blocks 166 and 174. From either blocks 166 and 174, the processor 14 proceeds to FIG. 3F to recalculate the price for the barcode printing supply product defined by the currently displayed variable values. The user may select up to two special printing options such as reverse printing. If a first special printing option is selected, the option is processed at block 178. After processing, processor 14 recalculates the price in accordance with the flow chart of FIG. 3F. If a second special printing option is selected, the processor 14 processes the second option at block 182 and again proceeds to FIG. 3F to adjust the price in accordance with the second special printing option selected.

The number of items selected and the number of shipments designated determines a minimum quantity of the product that is to be quoted on. If the processor 14 determines at block 184 that the number of items has been changed by a user input, the processor 14 proceeds to block 186 to process this event and then proceeds to the flow chart depicted in FIG. 3F to calculate minimum quantities for the specified product. The processor 14 thereafter determines whether the quantity specified in the quote is too small. If the quantity is determined to be too small, the processor 14 displays a message in a message window indicating that quantity 1, for example, is less than the current minimum allowed. This message also designates the minimum to which the quantity variable value must be raised in order to meet the associated minimum requirements. If the user acknowledges this message by entering an "okay" input, the processor 14 automatically changes the quantity variable value to meet the minimum requirement. thereafter, if the second or third quantity needs to be adjusted to meet any minimum requirement calculated therefore, a similar message will be displayed sequentially. The value of the quantity variable is also checked to determine if it is too large, as discussed below. If it is too large, a message is displayed in a message window indicating that the particular quantity, quantity 1, for example, represents a fairly large order and that the user should consult with the main office prior to quoting a price to the user. If the second or third quantities similarly need to be adjusted relative to a maximum value, a similar message will be sequentially depicted in a message window for each of these quantities.

The term "copy changes" represents the number of times a printing plate, that is employed to pre-print information on a supply, is to be changed during manufacturing due to changes in the information to be printed on the designated supply. If the user enters or changes this selection as determined by the processor at block 188, the processor 14 processes this event at block 190 in accordance with the set of allowable options stored therefore. Similarly, the term "ink changes" is utilized to designate the number of times that the printing plate has to be changed due to ink changes while manufacturing a designated supply. If ink changes has been selected by the user as determined by the processor 14 at block 192, the processor proceeds to block 194 to process this selected event in accordance with the set of allowable options stored in association therewith. The user is also allowed to select up to four other options. The other options may include for example the selection of: an oddly shaped supply; a fan folded supply; horizontal or vertical perorations; a breakaway or security slip; various sizes for the gap between labels; etc. The choices for the other options may be viewed by selecting respective arrows 61, 63, 65 and 67. When one to four options are selected as determined at blocks 196, 200, 204 and 208, the processor proceeds to respective blocks 198, 202, 206 and 210 to process the selected value thereof in accordance with the set of options associated therewith as stored in the memory 16.

As shown in FIG. 1, the system of the present invention is capable of providing price quotes for different quantities of the same product so that the user can immediately see how varying the value of the quantity variable can affect the price of the quoted product. For example, as shown in FIG. 1 in respective sections 24, 26 and 28 of the quote display screen, price quotes are provided for the different quantity variables, quantity 1=25,000, quantity 2=50,000 and quantity 3=100,000. When the user changes the default value for the respective variables, quantity 1, quantity 2 or quantity 3 at blocks 212, 216 and 220, the processor 14 processes the input quantity value at respective blocks 214, 218 and 222. Further, the user can input the number of shipments into which a given quantity is divided as determined by the processor 14 at block 224, 228 and 232 for the respective quantity values, quantity 1, quantity 2 and quantity 3 wherein the number of shipments is processed at a respective block 226, 230 or 234. If the processor 14 determines at block 232 that none of the default values of the variables specified for the default quote or another quote in process has been changed, the processor 14 proceeds from block 232 to block 236 to process any menu items that may have been selected by the user as discussed above witty respect to FIG. 2. If, however, a value of a variable depicted on the displayed quote has been changed by a user, the processor 14 after processing the input value for the selected variable proceeds to the flow chart depicted in FIG. 3F to compute the price of the product defined by the displayed quote for each quantity specified.

Figure 7:
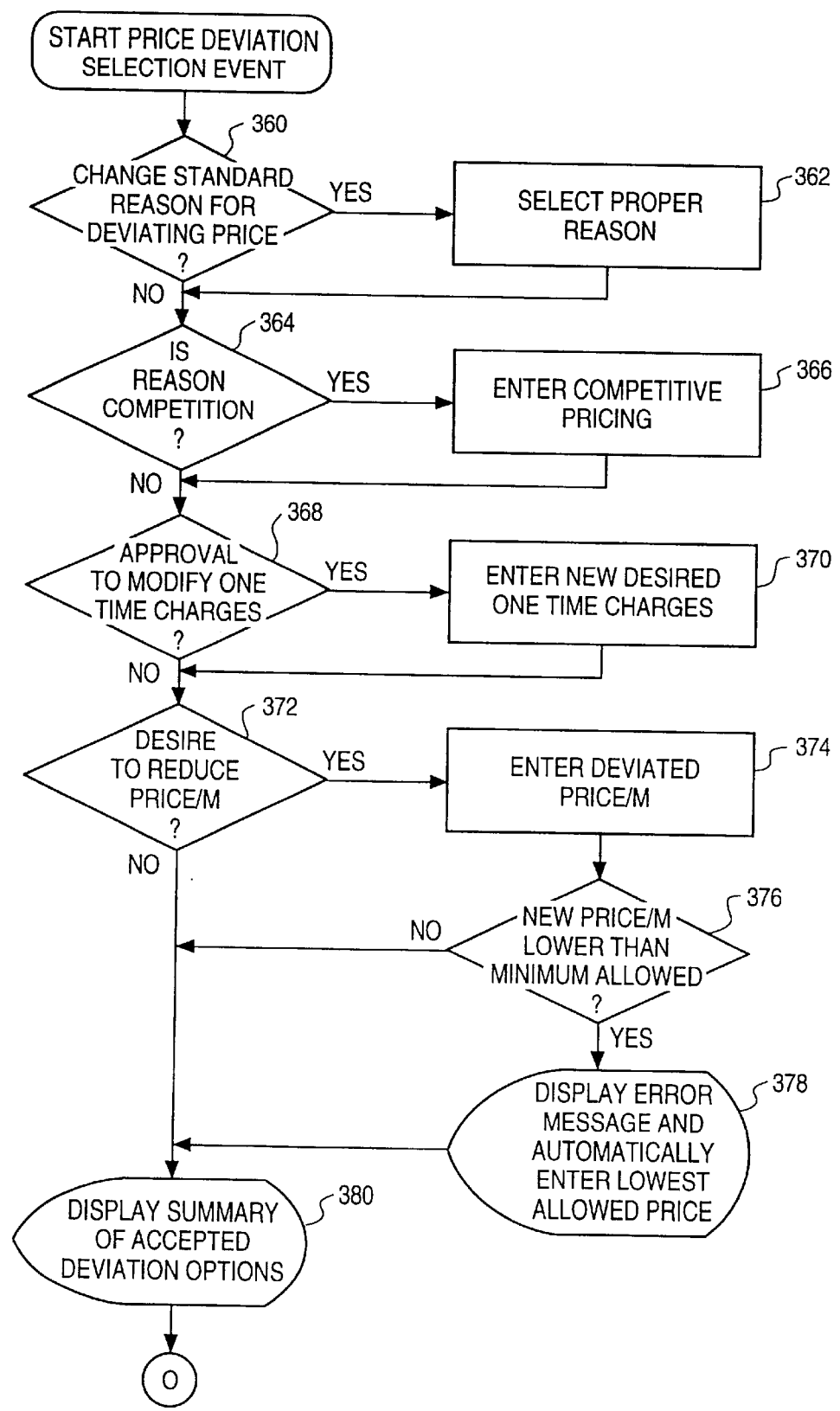
FIG. 7 is a flow chart illustrating the operation of the system to accommodate price deviations.

In order to compute the price values, the processor at block 240 first determines whether a price deviation record exists as discussed in detail below with respect to FIG. 7. If a record does exist, the processor proceeds to block 242 to display a message to the user indicating that a price deviation record is stored for the quote. The message requests the user to select whether to continue and reset the deviation data or to stop the calculation so that the deviation data is retained. At block 244, the processor determines whether the user has selected to continue the calculation with the deviation data being reset to zero in which case the processor proceeds from block 244 to block 246. If, however, the user selects to stop the calculation and retain its deviation data, the processor proceeds from block 244 to block 114. At block 246, the processor 14 determines whether an order record has been stored for the identified quote. If so, the processor 14 at block 248 displays a message to the user indicating that the user is changing a quote for which order data exists and that the user must re-select his desired order quantity before the order can be processed. If the user desires to continue the price computation with the changed quote, the order record associated therewith will be deleted from the memory and the processor will proceed from block 250 to block 252.

At block 252 the processor 14 determines a minimum value for each quantity section 24, 26 and 28 wherein the minimum quantity, may for example, be based on the "number of items" defined in section 69; the number of shipments defined for example in section 71 of the quantity section 24 and the size of the supply in relation to a minimum total area of supply product that can be quoted on as stored in the memory 16. Based upon the minimum quantity calculated at block 252, the processor proceeds to determine at block 254 whether any of the values specified for the quantity variable in the displayed fault quote are below the minimum calculated for that associated quantity section 24, 26 and 28. If so, the processor proceeds to block 256 to inform the user that quantity number 1, for example, is less than the current minimum allowed and that this value has automatically been adjusted to the minimum computed at block 252 so that the minimum quantity requirements are met. At block 258, the processor determines whether the user has accepted this adjustment of the quantity value by acknowledging the displayed message. When the displayed message is acknowledged, the processor proceeds from block 258 to block 260. At block 260, the processor 14 computes a maximum for each of the quantity variables in a manner noted above with respect to the minimum and then proceeds to block 262 to determine whether any of the quantity values depicted in the displayed quote are over the recommended maximum. If any of the quantities are over the recommended maximum, at block 264, the processor 14 displays a message to the user indicating that a particular quantity value represents a fairly large order and that the user might want to consult with the main office before proceeding. In the case where a quantity value exceeds a maximum, the system does not automatically reduce the quantity value ordered but allows the large quantity to be entered into the system and quoted upon.

Figure 3A:
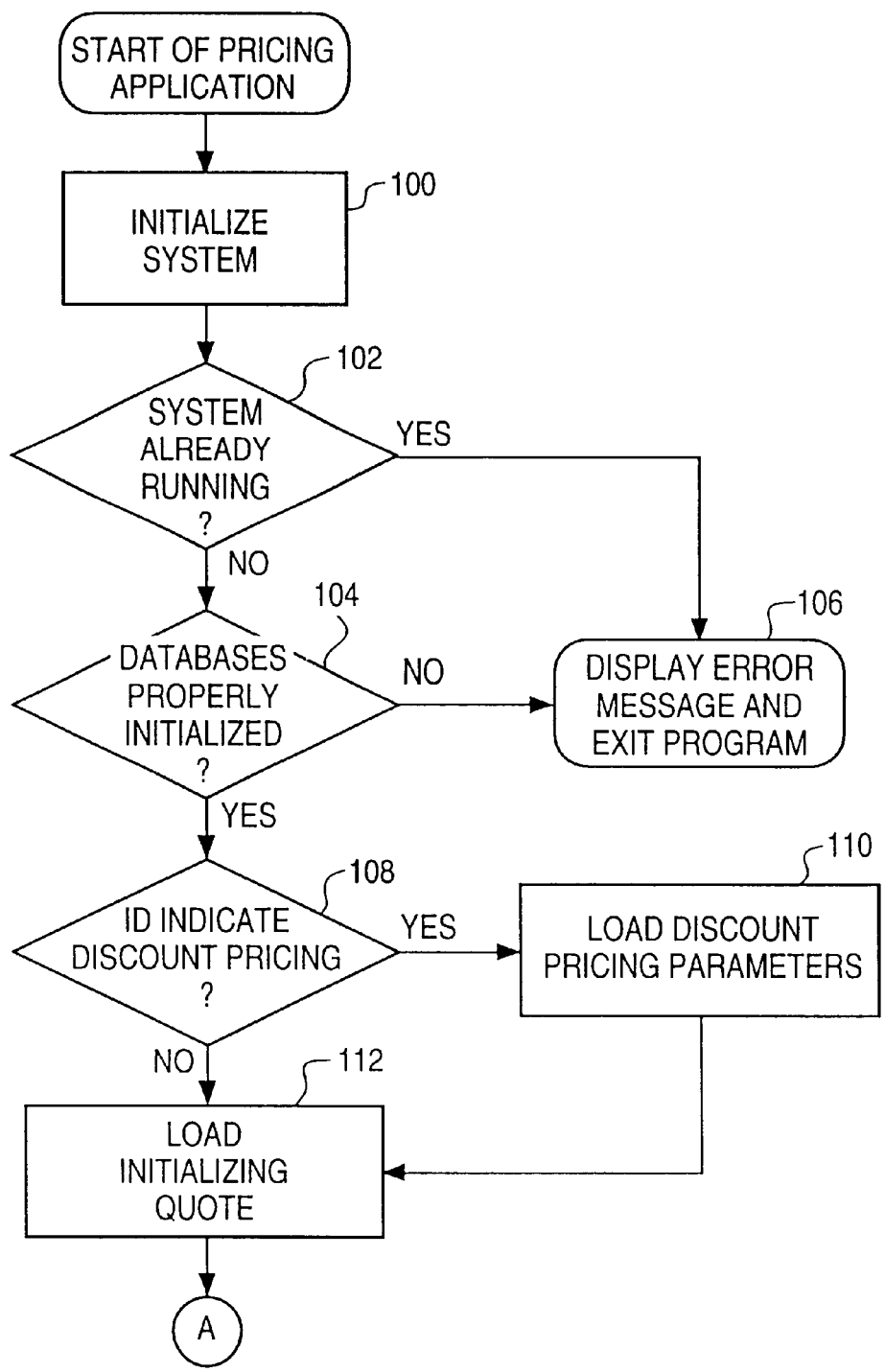
FIGS. 3A–3F form a flow chart illustrating the operation of the price quoting system of FIG. 1.
Figure 3B:
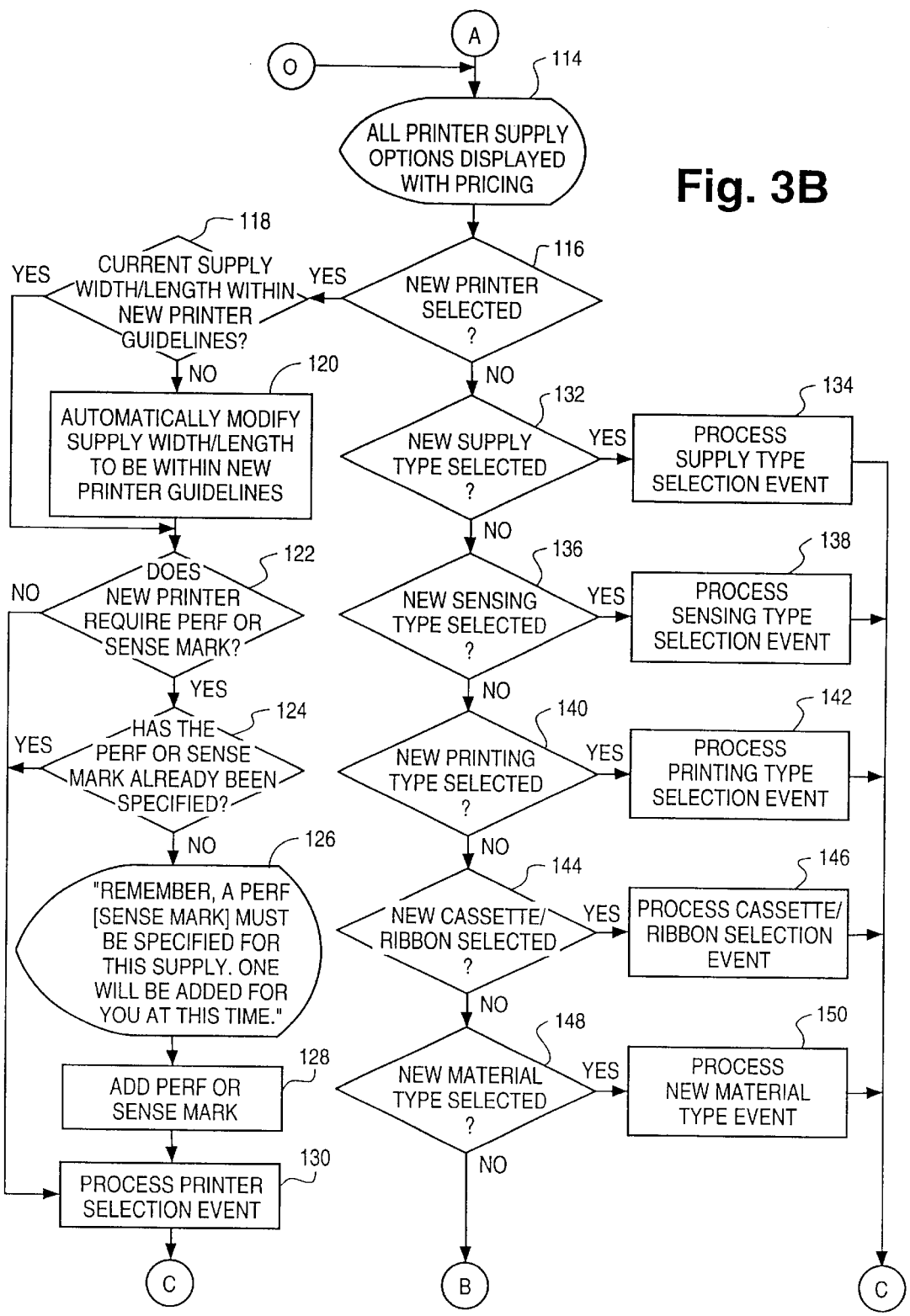
Figure 3C:
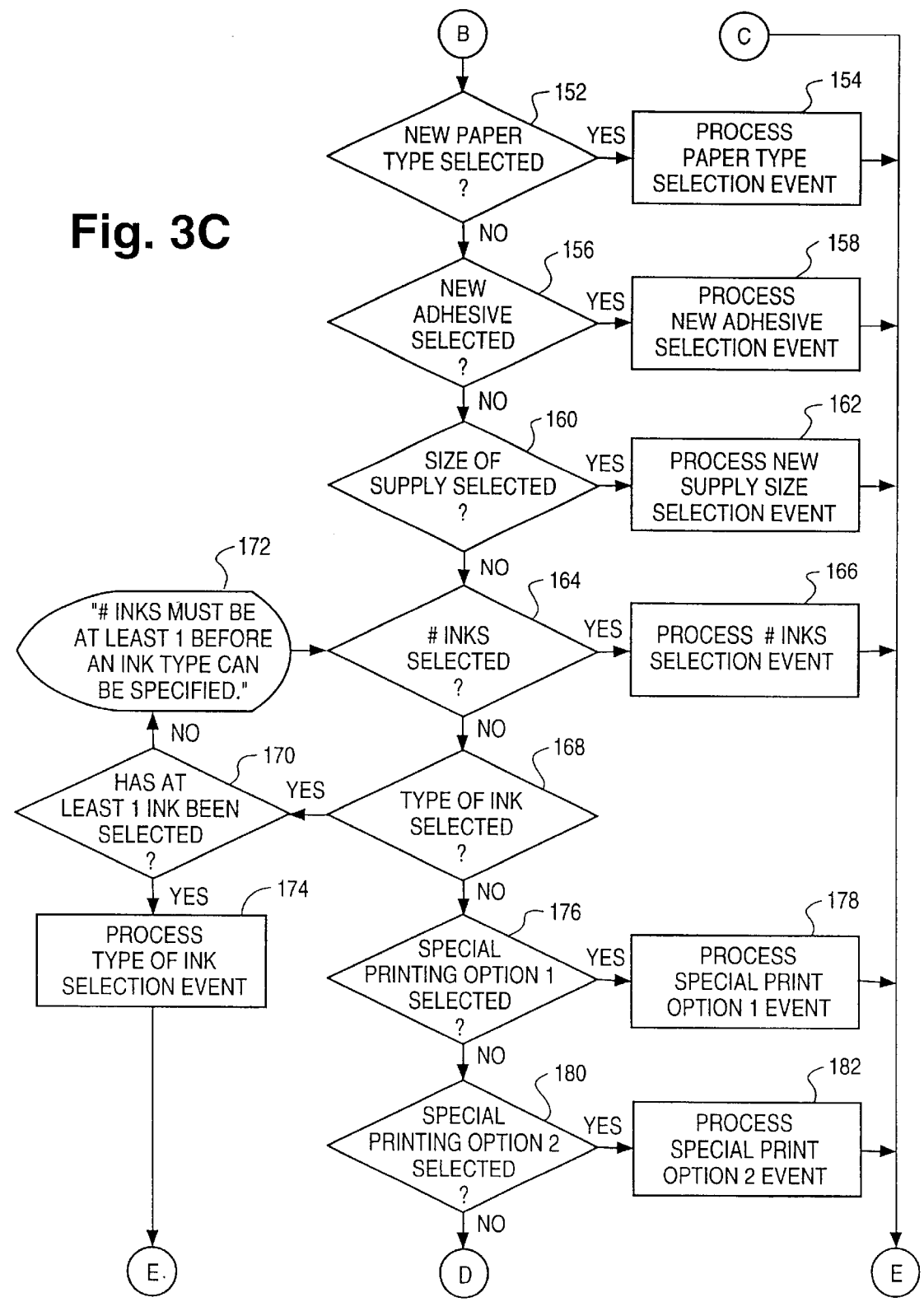
Figure 3D:
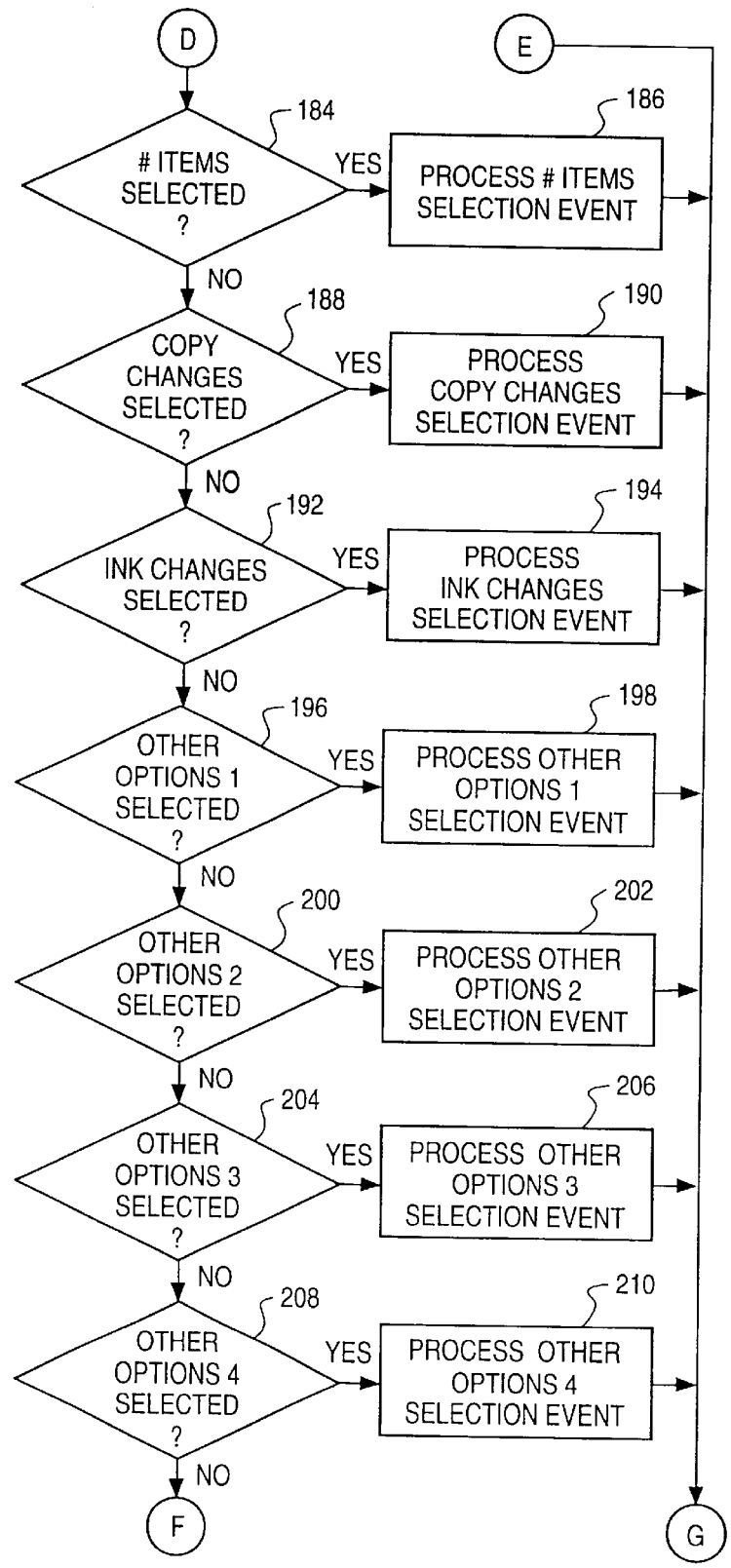
Figure 3E:
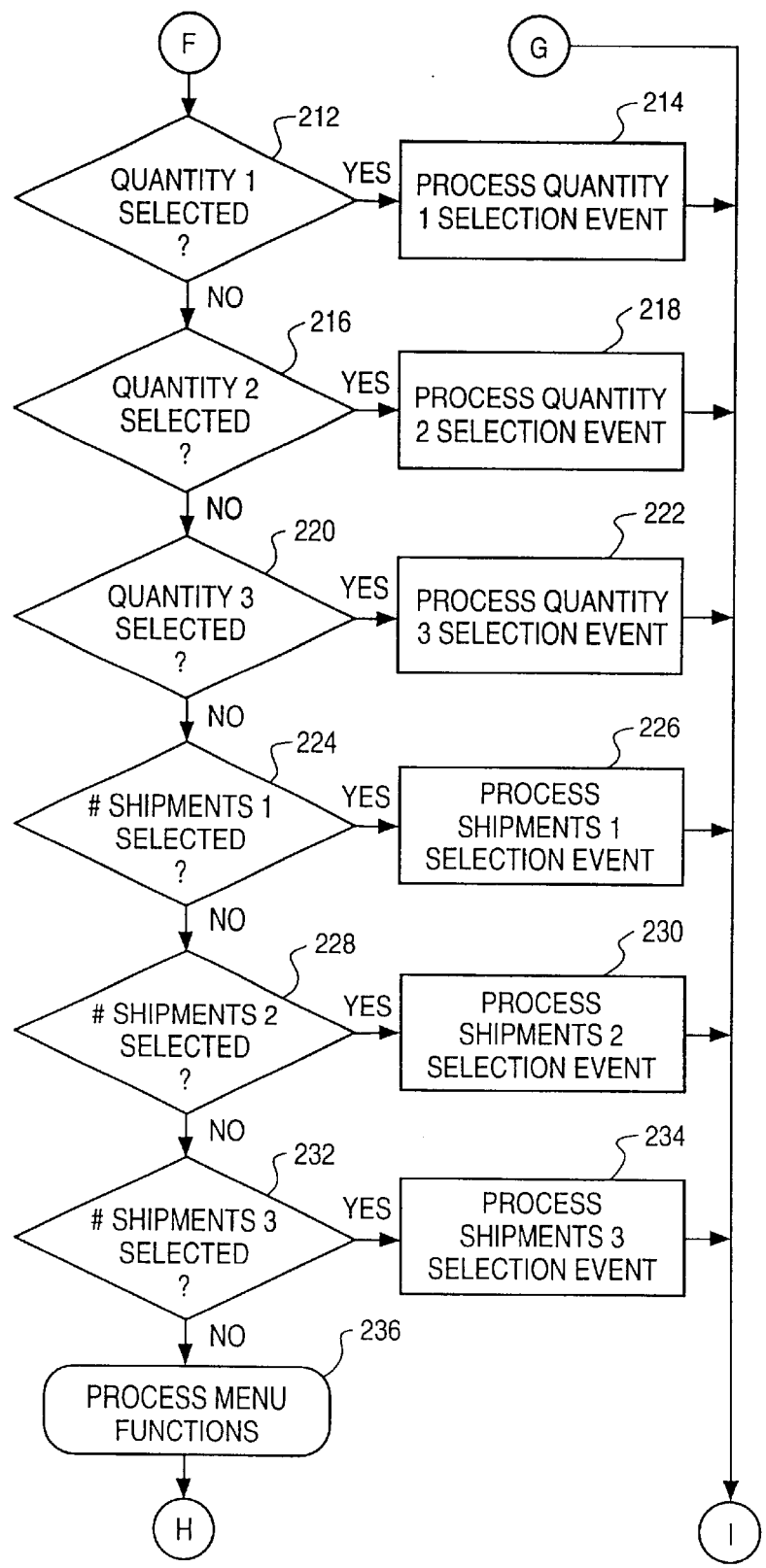
Figure 3F:
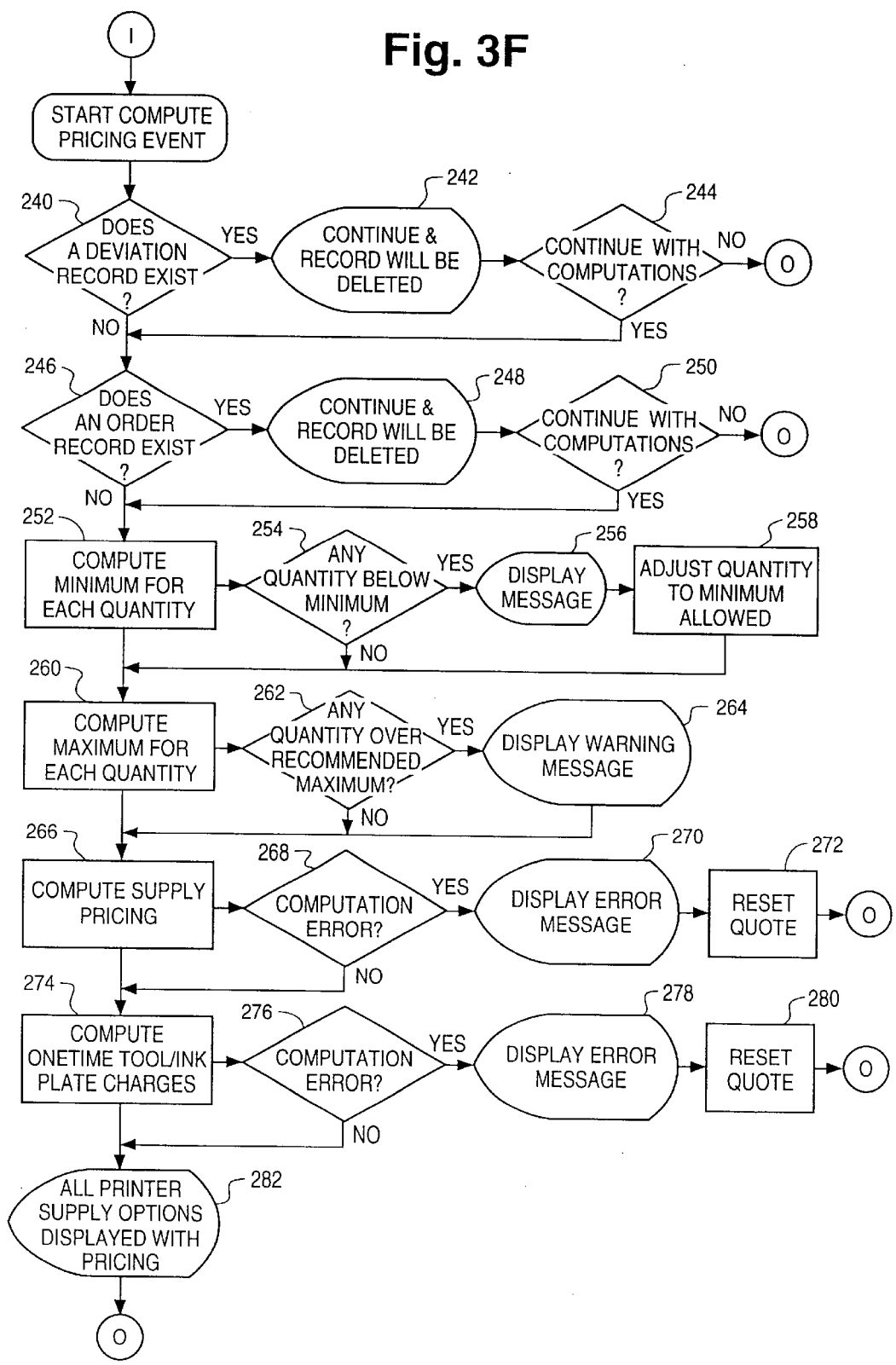

The processor 14 at block 266 computes the pricing according to any known method based upon the values of the variables specified in the displayed quote. At block 268, the processor 14 determines whether there are any computation errors. A computation error that the processor 14 may check for is a divide by 0 function which is not calculatable. Another computation error that the processor 14 might check for is a determination of whether the price exceeds predetermined limits in certain circumstances. If a computation error is detected at block 268, the processor 14 at block 270 displays an error message to the user. Thereafter, the processor 272 resets the quote to the default quote. It is noted, that since the computed pricing event depicted in FIG. 3F is calculated after the user enters a value for each variable affecting the price, the user is immediately aware that the last value that he entered for a given variable is contributing to the computation error. Further, at block 272, the processor 14 need only reset the value of the last variable entered to the default values stored therefore in the default quote to continue the computation. After computing the pricing of the barcode printing supply product defined by the displayed values for the variables of the quote, the processor 14 proceeds to block 274 to compute any one time charges that might be applicable as well as the total price. From block 274, the processor 14 proceeds to block 276 to determine whether there are any computation errors as discussed above. If a computation error is detected, the processor 14 displays an error message at block 278 and at block 280 resets the last value input by the user for a given variable. Upon successfully calculating the pricing of the defined barcode printing supply product and any one time charges, the processor 14 at block 282 displays the pricing information with the variable values defining the product quoted in the format of the quote 23 depicted on the display 22 of FIG. 1.

Figure 4:
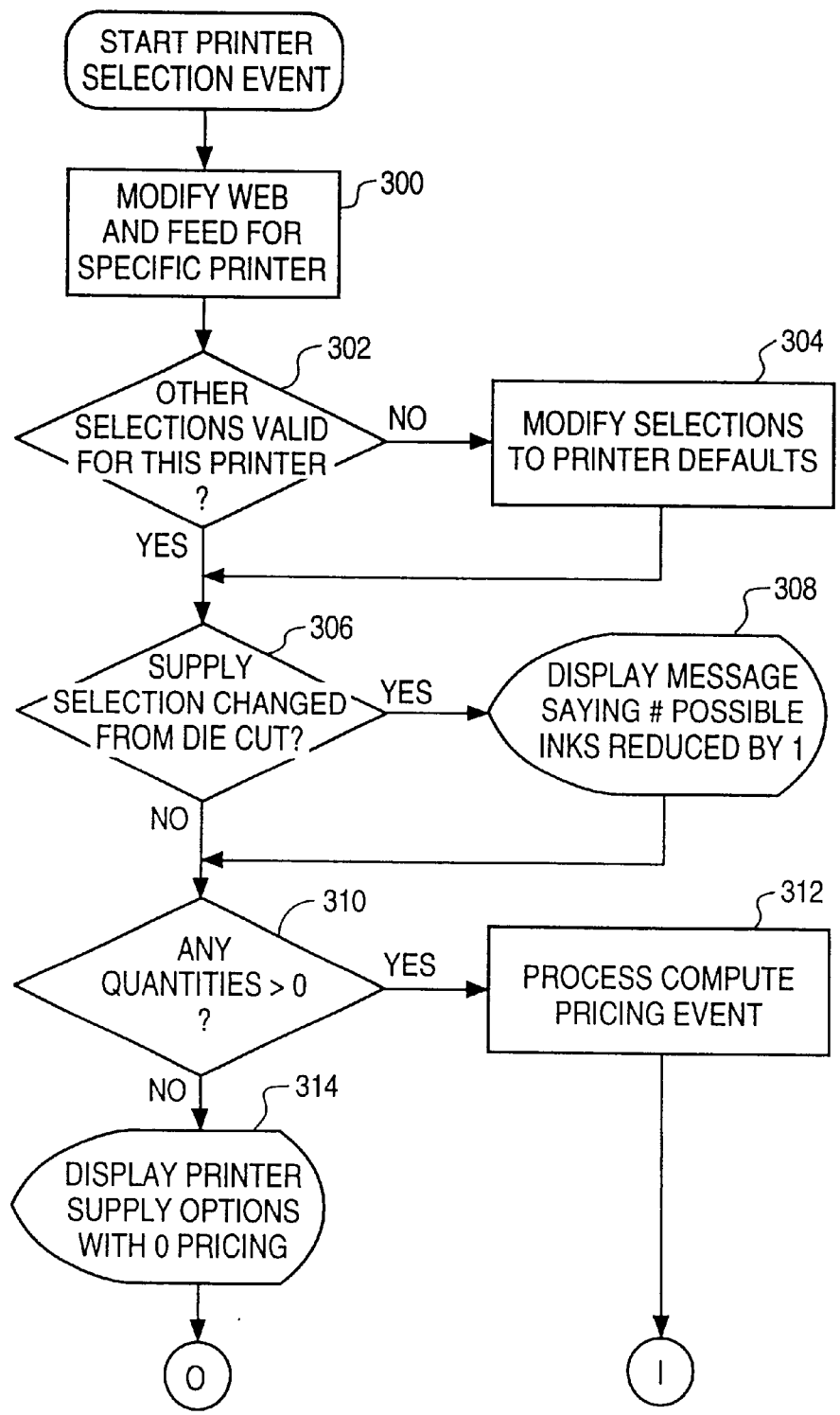
FIG. 4 is a flow chart illustrating the processing of the printer selection event shown in FIG. 3B.

An example of an algorithm according to which the processor 14 operates in response to a user input modifying the value of the variable in the section 30 labeled "Model" is illustrated in FIG. 4. The processor 14 is responsive to a change in the value of the model variable by modifying the values specified for the "Web" section 41 and for the "Feed" section 43 so that these values are correct for the specified printer as discussed above, this information is stored in the set of allowable options that are associated with the selected value of the "Model" variable. Thereafter, at block 302, the processor 14 determines whether the values displayed for the other values are still valid given the change in barcode printers. If not, the processor 14 proceeds from block 302 to block 304 to automatically modify any of the invalid variable values so as to display allowable values therefore in accordance with the stored set of allowable options. Thereafter, at block 306, the processor 14 determines whether the "supply sensing" variable was changed from a "die cut" value. If so, at block 308, the processor 14 displays a message indicating that the number of possible inks is reduced by one. At block 310, the processor 14 determines whether any of the quantity variables has a value greater than zero and if so, proceeds to block 312. At block 312, the processor 14 calculates the price for each of the quantity variables having a value greater than zero in accordance with the flow chart depicted in FIG. 3F so that the displayed price will reflect the changes in the designated printer model and the values of any other associated variables that were automatically altered. If all of the quantity variables have a value equal to zero, the processor 14 proceeds from block 310 to block 314 displaying a quote as depicted in FIG. 1 defining a particular barcode printing supply product with zero pricing.

Figure 5:
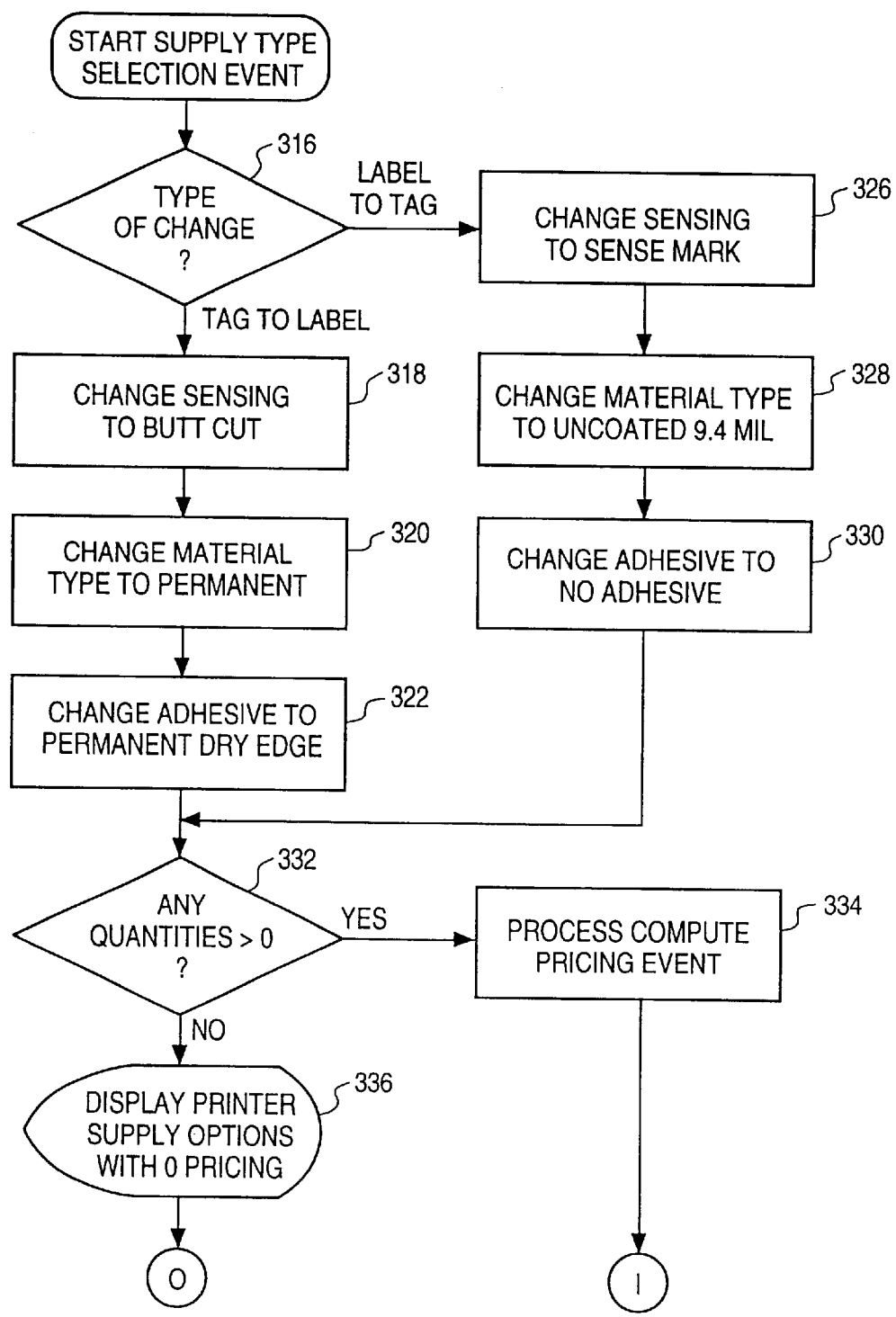
FIG. 5 is a flow chart illustrating the processing of the supply type selection event illustrated in FIG. 3B.

FIG. 5 illustrates a subroutine according to which the processor 14 operates in response to a change in the type of supply as designated in section 32 of the displayed quote 23. At block 316, the processor 14 determines whether the supply has been changed from a label to a tag or from a tag to a label. If the supply has changed from a tag to a label, the processor proceeds to block 318 to change the type of sensing to a butt cut designation to indicate the most common type of sensing used for label supply products. Thereafter, the processor proceeds to block 320 to change the material type to permanent. Next, the processor 14 at block 322 changes the adhesive to permanent dry edge. If the supply was changed from a label to a tag, the processor 14 proceeds from block 316 to block 326. At block 326, the processor 14 changes the type of sensing to designate a sense mark. Thereafter, at blocks 328 and 330 respectively, the processor 14 changes the material type to designate an uncoated 9.4 millimeter material with no adhesive. From blocks 322 and 330, the processor 14 proceeds to block 332 to determine whether any of the quantity variables has a value that is greater than zero. If so, the processor 1,4 proceeds to block 334 to implement the compute pricing event as depicted in FIG. 3F. If, however, each of the quantity variables has a value that is set equal to zero, the processor 14 at block 336 displays the values of the variables in the depicted quote with zero pricing.

Figure 6:
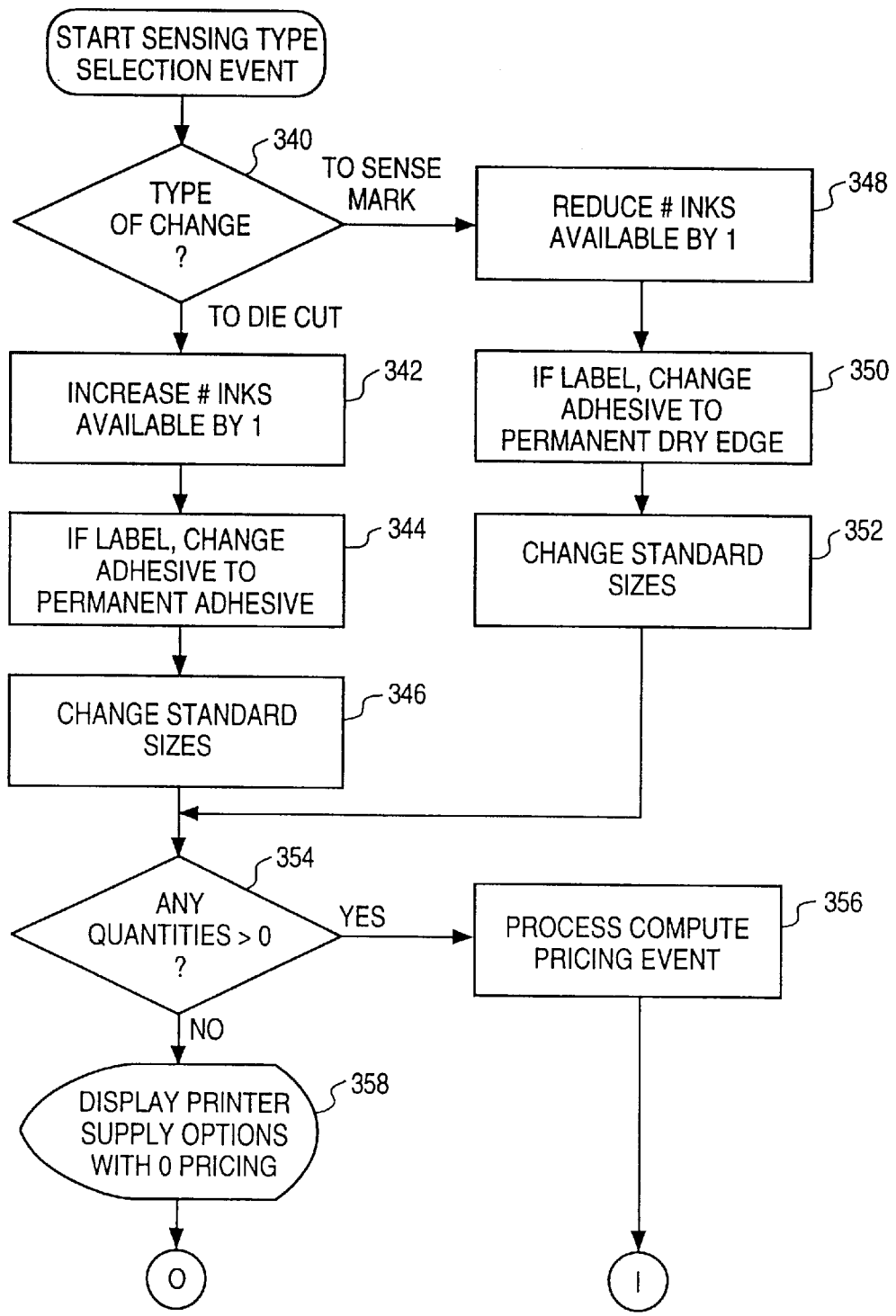
FIG. 6 is a flow chart illustrating the processing of the sensing type selection event shown in FIG. 3B.

FIG. 6 illustrates a subroutine according to which the processor 14 operates in response to a change in the type of sensing to be employed. At block 340, the processor 14 determines whether the sensing type has been changed to a die cut sensing type or to a sense mark sensing type. If the designation of the sensing type has been changed to specify die cut, the processor 14 at block 342 increases the number of inks that are available by one. Thereafter, at block 344, the processor 14 changes the adhesive to designate a permanent adhesive if the supply designated in section 32 of the display screen for the quote is a label. Thereafter, at block 346, the processor 14 changes the sizes depicted respectively in the web section 41 and the feed section 43 to depict the standard sizes that are available for the designated supply and sensing type. If, the processor 14 determines at block 340 that the type of sensing has been changed to designate a sense mark sensing type, the processor 14 proceeds to block 348 to reduce the number of inks available by one. At block 350, the processor 14 changes the adhesive to designate a permanent dry edge adhesive if the supply type is a label. The processor 14 thereafter changes at block 352 the web size section 41 and the feed size section 43 to depict the standard sizes for the designated supply and sensing type as stored in the memory 16. Thereafter, the processor 14 determines at block 354 whether any of the quantity variables has a value greater than zero. If so, the processor proceeds to block 356 to implement the compute pricing event depicted in FIG. 3F. Otherwise, the processor 14 displays the values defining the designated barcode printing supply product with zero pricing on the quote depicted on the display 22.

Figures 10, 11:
FIG. 10 is an illustration of a display screen utilized for the price deviation operation of FIG. 7.
FIG. 11 is an illustration of a display screen utilized when the reason for a requested price deviation is a competitive situation.

As discussed above, one of the user selectable "Options" menu choices allows the user to ether a price value for a quote that is different from the price automatically calculated by the routine depicted in FIG. 3F. The processor 14 is responsive to the selection of the "deviate quoted amounts" Options menu choice by displaying information to the user requesting various information as depicted in FIG. 10. This information allows the user to enter the name or an identification of the prospective purchaser for which the variance is requested. A default reason or standard reason for the requested price deviation is automatically displayed. If the user is requesting a price change for a reason different from the displayed default reason, the user can scroll through a set of stored allowable reasons that are depicted on the display 22 by selecting the arrow 390 adjacent to the displayed reason section 391. The processor 14 is responsive to the user's inputs by displaying the selected reason at block 362. Thereafter, the processor 14 at block 364 determines whether the reason for the requested price deviation is competition. If so, the display is changed to that depicted in FIG. 11 wherein the user is prompted to enter the competitor's name in the display section 393 and to also enter the competitor's price in association with a respective quantity variable value in section 395. The user is also prompted to enter the price that the user wishes to quote to the prospective customer in association with each of the quantity variable values. If the desired price entered in the section 397 of the display is lower than an allowed price as stored in the memory 16 in association with the type of barcode printing supply product being ordered, the processor 14 displays a message to the user indicating that the requested price is below an approved minimum and the approved minimum is displayed in the approved price section 399 of the display. If the desired price entered by the user in the display section 397 is not below the minimum, the processor 14 displays the same price in the approved price section 399 indicating that the price deviation requested is approved. If the processor 14 determines at block 368 that the reason for the requested price deviation is for an approval to modify one time charges, the processor 14 at block 370 modifies the display so as to depict the screen illustrated in FIG. 12. Once the user enters the new amount for one time charges, the processor 14 recalculates the total price in accordance with this change. If the reason for the change is merely a desire to reduce the price as determined by the processor 14 at block 372, the processor at block 374 enters the deviated price. Thereafter, at block 376, the processor 14 determines whether the entered price is lower than the minimal allowed for this specified reason. If so, the processor 14 displays a message indicating that the requested price is lower than the minimum allowed and that the lowest allowed price has been automatically entered on the displayed price deviation form. It is noted that different minimums are preferably stored for a price deviation request that is based on competition and those deviation requests that are based merely on a desire to reduce the price. Once a deviated price has been accepted, the processor 14 displays the approved price deviation at block 380 and thereafter, returns to block 114. At block 114, the processor 14 displays the price quote to the user with all of the values of the variables defining the barcode printing supply product as well as the quantity and price with the price being depicted on the display 22 in red or another distinguishing color that identifies the price as one that has been deviated from. Thereafter, each time the quote is subsequently requested for display, the price will be depicted in red or other distinguishing color to alert the user that a deviated price record is stored for the quote.

Figure 8:
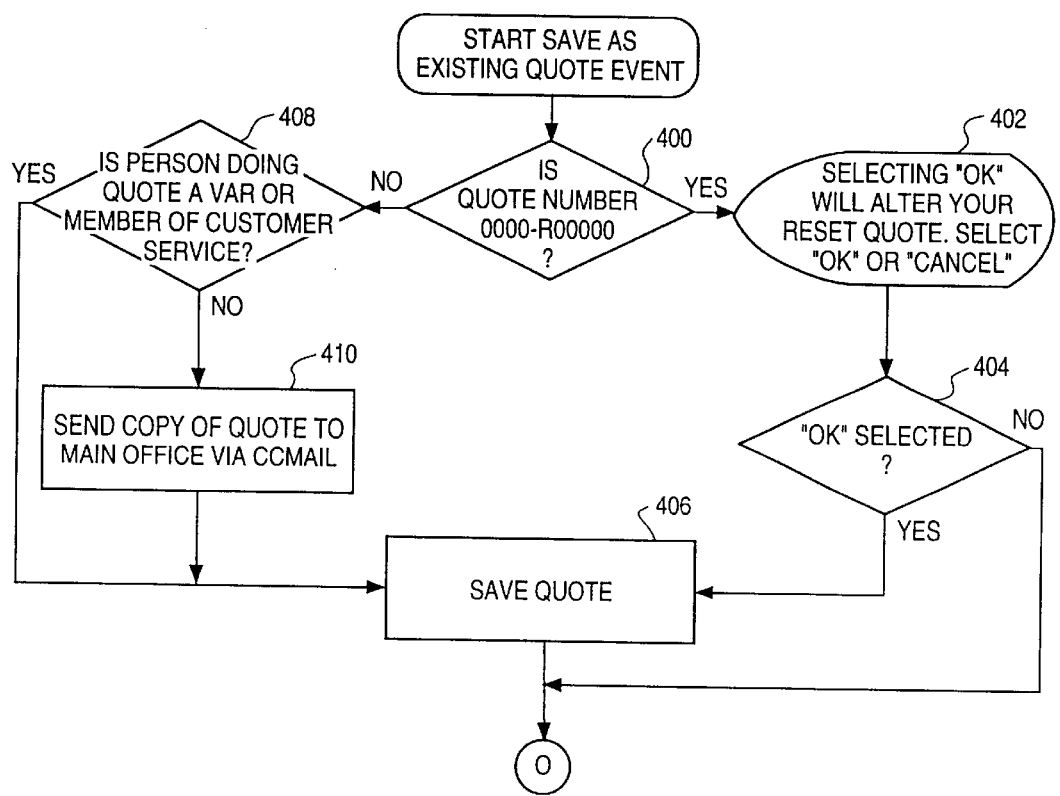
FIG. 8 is a flow chart illustrating the resetting of the default quote to a new reset default quote.
Figure 9:
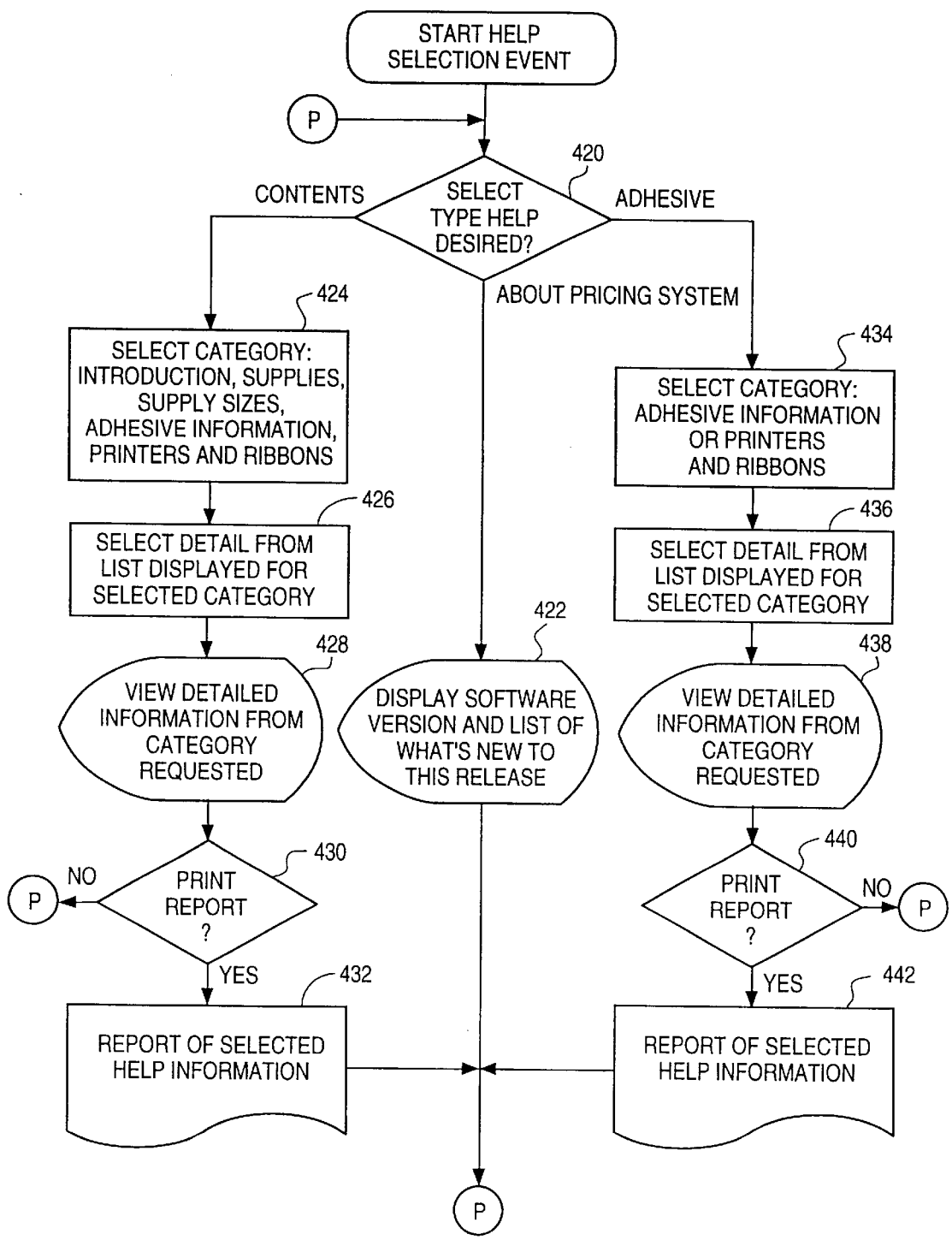
FIG. 9 is a flow chart illustrating a help routine.

The processor 14 is responsive to the menu choice selection "save existing quote" at block 46 by implementing the routine depicted in FIG. 8. Upon selecting this option, the processor 14 determines at block 400 whether the quote number associated with the displayed quote is within a certain range. If so, the processor proceeds to block 402 to display a message to the user asking the user if he wants to save the currently depicted quote as his reset default quote. If the processor 14 determines at block 404 that the user has selected via an input device to save the quote as his reset default quote, the processor proceeds to block 406 to save the quote as the reset default quote. It is noted that, in a preferred embodiment, the original default quote is still maintained in the memory 16 and is displayed whenever the system is initially turned on. However, upon actuation of the "reset current quote" option by the user, the processor 14 controls the display to depict the reset default quote as opposed to the original default quote. By maintaining the original default quote stored in the system, the user can always return to that default quote if desired. If the processor 14 determines at block 400 that the quote number was not within the predetermined range, the processor 14 proceeds to block 408 to determine whether the prospective purchaser for which the quote is being processed is a value added reseller or a member of customer service or the like. If not, the processor 14 proceeds to block 410 to send a copy of the quote to the main office via a wired or wireless network. From either blocks 408 or 410 the processor 14 proceeds to block 406 to save the displayed quote in association with the designated quote number.

If the help menu choice has been selected by the user, the processor 14 proceeds to block 420 to determine the type of help that the user desires. If the processor determines that the user needs information regarding the pricing system itself, the processor 14 proceeds to block 422 to display the software version number and a listing of the new features or changes in the currently running release. If the processor determines that the user has a question regarding "contents", the processor proceeds to block 424 to display various categories such as introduction, supplies, supply sizes, adhesive information, printers and ribbons. The user can then select one of the categories, to which selection the processor 14 responds by retrieving information at block 426 for the selected category. Thereafter, at block 428, the processor displays tutorial information retrieved for the selected item.

At block 430, the processor 14 determines whether a report is to be printed and if not, the processor returns to block 420. If the processor determines that a report is requested, at block 422 the processor controls the printer 25 to provide a printout of the user selected help information. If the processor determines at block 420 that the user has selected the adhesive category, the processor 14 proceeds to block 434 to prompt the user to select among adhesive information, barcode printers or ribbons. At block 436 the processor 14 is responsive to a user selection of a particular category by displaying at block 438 detailed information regarding the selected category. If a print report is requested as determined at block 440, the processor 14 controls the printer 25 at block 442 to print a report of the displayed help information.

A stored quote can automatically be turned into an order in minutes as opposed to weeks as in the case of prior price quoting systems for barcode printing supply products. In order to create an order, the user selects the options menu choice "add/change order data" depicted at block 74. In response thereto, the processor 14 controls the display 22 to depict the display screen order form as illustrated in FIG. 13 with the prospective purchaser's name being automatically filled in as is the price quote number and an order product ID. Once the remaining information is entered by the user, the processor 14 will display the quantity pricing data and request the user to select the quantity variable that he wishes to become an order. If the number of shipments associated with the selected quantity variable is greater than one, the processor 14 also prompts the user via the display 22 to enter a shipping date for each of the shipments. Once the order is completed, the user can select the print order information so as to have a record of the order automatically printed.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A method for operating a system to automatically provide price quotes for a plurality of different types of barcode Printing supply products associated with different types of barcode printers, said system having a display for displaying information and an input device operable by a user to selectively change said displayed information, said method comprising:

displaying a default quote depicting a default value for each of a plurality of variables defining a barcode printing supply product, said default quote including at least one default quantity value and an associated price;

storing for at least one of said barcode printing supply product defining variables a set of allowable options for other of said barcode printing supply product defining variables associated with said one variable;

changing said displayed default quote in response to a user input change of the default value of said one variable to automatically depict any necessary changes in said other variables associated with said one variable based upon said one stored set of allowable options;

adjusting the price displayed in response to each user input change to the value of a variable affecting the price to allow a user to see how each change in the variable affects the price;

displaying a message requesting a user to enter one of a plurality of reasons for a price change in response to a user's request to deviate from a price displayed in a quote for a barcode printing supply product; and authorizing different price deviations depending upon the reason entered by the user for the requested price deviation.

2. A method for operating a system to automatically provide price quotes as recited in claim 1 including the step of displaying a price in said displayed quote in a manner to alert the user that there has been a price deviation associated therewith.

3. A method for operating a system to automatically provide price quotes as recited in claim 2 wherein a price for which a deviation has been made is displayed in said quote in a color different from a price for which no deviation has been made.

4. A method for operating a system to automatically provide price quotes as recited in claim 1 including the steps of storing for each of said reasons a minimum deviation value allowable for the respective reason; comparing a user requested price deviation to said minimum deviation allowable for the user entered reason; and authorizing said requested price deviation if said requested price deviation is not less than said minimum deviation allowed.

5. A method for operating a system to automatically provide price quotes for a plurality of different types of barcode printing supply products associated with different types of barcode printers, said system having a display for displaying information and an input device operable by a user to selectively change said displayed information, said method comprising:

displaying a default quote depicting a default value for each of a plurality of variables defining a barcode printing supply product;

storing for at least one of said barcode printing supply product defining variables a set of allowable options for other of said barcode printing supply product defining variables associated with said one variable;

changing said displayed default quote in response to a user input change of the default value of said one variable to automatically depict any necessary changes in said other variables associated with said one variable based upon said stored set of allowable options; and storing a changed default quote as a new default quote automatically displayable in response to a reset input to start a new quote.

6. A method for operating a system to automatically provide price quotes as recited in claim 5 wherein said displayed default quote includes at least one default quantity value and an associated price.

7. A method for operating a system to automatically provide price quotes as recited in claim 6 wherein said step of displaying includes displaying said plurality of barcode printing supply product variables, said quantity value and said associated price simultaneously on said display.

8. A method for operating a system to automatically provide price quotes as recited in claim 6 including the step of adjusting the price displayed in response to each user input change to the value of a variable affecting the price to allow a user to see how each change in the variable affects the price.

9. A method for operating a system to automatically provide price quotes for a plurality of different types of barcode printing supply products associated with different types of barcode printers, said system having a display for displaying information and an input device operable by a user to selectively change said displayed information, said method comprising:

displaying a default quote depicting a default value for each of a plurality of variables defining a barcode printing supply product wherein said displayed default quote includes at least one default quantity value and an associated price;

storing for at least one of said barcode printing supply product defining variables a set of allowable options for other of said barcode printing supply product defining variables associated with said one variable;

changing said displayed default quote in response to a user input change of the default value of said one variable to automatically depict any necessary changes in said other variables associated with said one variable based upon said stored set of allowable options;

determining a minimum quantity allowable for a barcode printing supply product defined by said variables each time one of said variables is changed to define a different product;

comparing said quantity displayed in said quote to said determined minimum; and displaying information to the user indicating that the minimum quantity has not been met if said displayed quantity is less than said determined minimum.

10. A method for operating a system to automatically provide price quotes for a plurality of different types of barcode printing supply products associated with different types of barcode printers said system having a display for displaying information and an input device operable by a user to selectively change said displayed information, said method comprising:

displaying a default quote simultaneously depicting a default value for each of a plurality of variables, including an identity of a type of barcode printing supply product, a quantity of said product and a price;

automatically adjusting the price displayed to a new value in response to each change of a displayed variable value affecting the price to display each new price value resulting from a change in one of said displayed variable values as each of said displayed variable values is changed to allow a user to see how a change in a variable affects said price;

displaying a message requesting a user to enter one of a plurality of reasons for a price change in response to a user's request to deviate from a price displayed in a quote for a barcode printing supply product; and authorizing different price deviations depending upon the reason entered by the user for the requested price deviation.

11. A method for operating a system to automatically provide price quotes as recited in claim 10 including the step of displaying a price in said displayed quote in a manner to alert the user that there has been a price deviation associated therewith.

12. It A method for operating a system to automatically provide price quotes as recited in claim 11 wherein a price for which a deviation has been made is displayed in a quote in a color different from a price for which no deviation has been made.

13. A method for operating a system to automatically provide price quotes as recited in claim 10 including the steps of storing for each of said reasons a minimum deviation value allowable for the respective reason; comparing a user requested price deviation to said minimum deviation allowable for the user entered reason; and authorizing said requested price deviation if said requested price deviation is not less than said minimum deviation allowed.

14. A method for operating a system to automatically provide price quotes for a plurality of different types of barcode printing supply products associated with different types of barcode printers said system having a display for displaying information and an input device operable by a user to selectively change said displayed information, said method comprising:

displaying a default quote simultaneously depicting a default value for each of a plurality of variables including an identity of a type of barcode printing supply product, a quantity of said product and a price; and automatically adjusting the price displayed to a new value in response to each change of a displayed variable value affecting the price to display each new price value resulting from a change in one of said displayed variable values as each of said displayed variable values is changed to allow a user to see how a change in a variable affects said price;

determining a minimum quantity allowable for a barcode printing supply product defined by said variables each time one of said variables is changed to define a different product;

comparing said quantity displayed in said quote to said determined minimum; and displaying information to the user indicating that the minimum quantity has not been met if said displayed quantity is less than said determined minimum.

15. A method for operating a system to automatically provide price quotes for a plurality of different types of barcode printing supply products associated with different types of barcode printers, said system having a display for displaying information and an input device operable by a user to selectively change said displayed information, said method being implemented by software comprising:

storing first default quote information including a default value for each of a plurality of variables including an identity of a type of barcode printing supply product, a quantity of said product and a price;

displaying said first default quote information depicting said default values for said plurality of variables;

changing said displayed quote in response to a user input change of one or more of said default values;

storing said changed quote as a second default quote which the system automatically displays upon starting a new quote; and displaying said first default quote upon starting of said software and displaying said second default quote after the starting of said software in response to a reset input to start a new quote.

16. A method for operating a system to automatically provide price quotes for a plurality of different types of barcode printing supply products associated with different types of barcode printers, said system having a display for displaying information and an input device operable by a user to selectively change said displayed information, said method comprising:

displaying price quote information for a particular type of barcode printing supply product in a particular quantity;

displaying a message requesting a user to enter one of a plurality of reasons for a price change in response to a user request to deviate from a displayed price quote; and authorizing different price deviations depending upon the reason entered by the user for the requested price deviation.

17. A method for operating a system to automatically provide price quotes as recited in claim 16 including the step of displaying a price quote depicting a plurality of variables defining a barcode printing supply product and a price, said price being displayed in a manner to alert a user of a price deviation.

18. A method for operating a system to automatically provide price quotes as recited in claim 17 wherein a price for which a deviation has been made is displayed in said price quote in a color different from a price for which no deviation has been made.

19. A method for operating a system to automatically provide price quotes as recited in claim 16 including the steps of storing for each of said reasons a minimum deviation value allowable for the respective reason; comparing a user requested price deviation to said minimum deviation allowable for the user entered reason; and authorizing said requested price deviation if said requested price deviation is not less than said minimum deviation allowed.

20. A method for operating a system to automatically provide price quotes for a plurality of different types of barcode printing supply products associated with different types of barcode printers, said system having a display for displaying information and an input device operable by a user to selectively change said displayed information, said method comprising:

displaying a default quote simultaneously depicting a default value for each of a plurality of variable defining a barcode printing supply product, a quantity of said product and a price; and determining a minimum quantity allowable for a barcode printing supply product defined by said variables each time one of said variables is changed to define a different product;

comparing said quantity displayed in said quote to said determined minimum; and automatically displaying information to the user indicting that the minimum quantity has not been met if said displayed quantity is less than said minimum.

\* \* \* \* \*